United States Patent

[11] 3,594,588

[72] Inventors Philip C. Evans
  Phoenix;
  Robert J. Haver, Tempe, both of, Ariz.
[21] Appl. No. 811,720
[22] Filed Apr. 1, 1969
[45] Patented July 20, 1971
[73] Assignee Motorola, Inc.
  Franklin Park, Ill.

[54] FREQUENCY DETECTION SYSTEM
7 Claims, 5 Drawing Figs.
[52] U.S. Cl. .................................................. 307/233,
  307/273, 307/290
[51] Int. Cl. ....................................................... H03k 5/00
[50] Field of Search ............................................ 307/233,
  290, 273; 328/140, 149, 205, 206

[56] References Cited
UNITED STATES PATENTS
3,153,196 10/1964 McGuire ...................... 307/290 X
3,333,109 7/1967 Updike .......................... 307/233

3,497,816 2/1970 Fritz et al. ...................... 307/233 X
3,502,904 3/1970 Bordonaro .................... 307/233
FOREIGN PATENTS
1,077,878 8/1967 Great Britain ................. 307/290

Primary Examiner—John S. Heyman
Attorney—Mueller & Aichele

ABSTRACT: A frequency-detecting system which includes frequency-to-voltage conversion circuitry operative to convert a fixed frequency signal into a DC ripple voltage, the level of which may be varied by varying system resistance A Schmitt trigger is connected to receive the DC ripple voltage and provide in response thereto either: (1) one or the other of two fixed DC output voltages, or (2) an output pulse waveform which alternates between the two fixed DC voltage levels. An output circuit is connected to the Schmitt trigger to provide one output voltage if the Schmitt trigger output signal is an alternating voltage and another output voltage if the Schmitt trigger output signal is a fixed DC voltage.

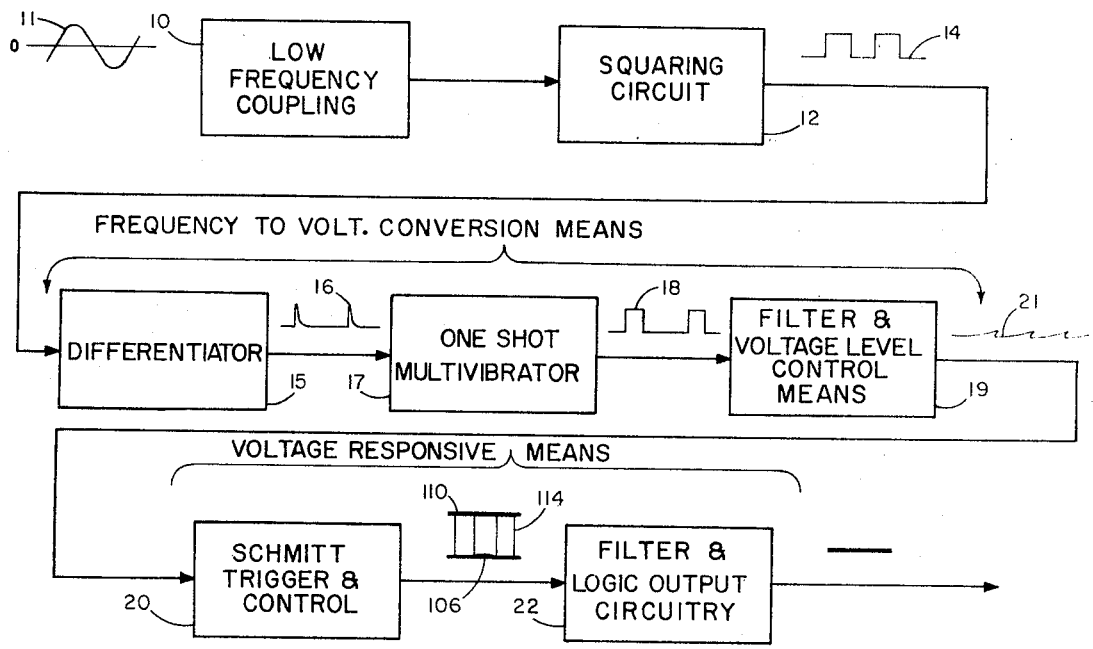
Fig. 1
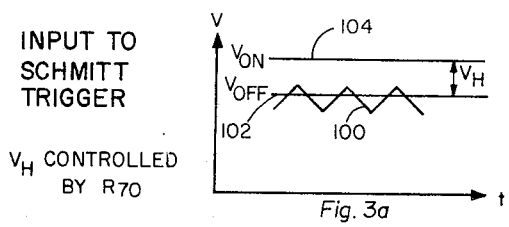
INPUT TO SCHMITT TRIGGER
$V_H$ CONTROLLED BY R70
Fig. 3a
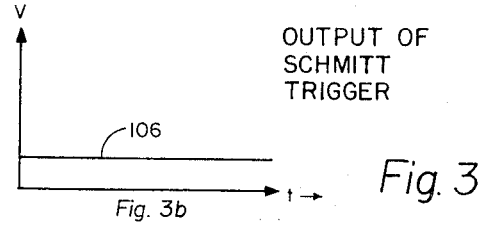
OUTPUT OF SCHMITT TRIGGER
Fig. 3b
Fig. 3
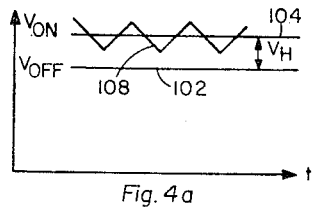
Fig. 4a
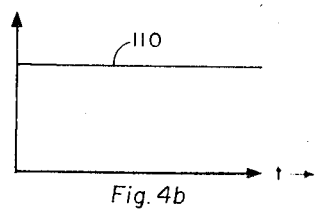
Fig. 4b
Fig. 4
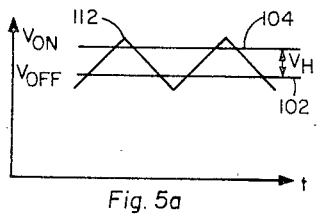
Fig. 5a
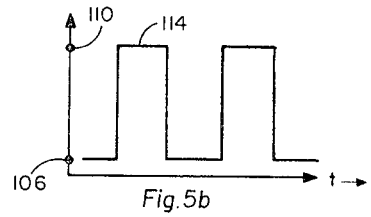
Fig. 5b
Fig. 5
INVENTOR.
Philip C. Evans
Robert J. Haver
BY
ATTY'S.

FREQUENCY DETECTION SYSTEM

BACKGROUND OF THE INVENTION

This invention relates generally to the frequency detection or sensing of electrical signals and more particularly to an alarm system for detecting the presence of a preselected low-frequency signal. AC alarm systems of the general type to be described herein commonly use telephone lines for the transmission of AC signals. In the use of these telephone lines, low frequency signals are generally preferred or required in order to prevent the electrical interference associated with higher frequencies. Therefore, the AC frequency detection portion of the alarm system should be relatively sensitive to low frequencies.

Some known prior art low frequency detection systems of the above general type are constructed using inductance-capacitance (LC) filter networks. However, in order to provide the resonance required at low frequencies, the inductance and capacitance components of these filter networks must be large and are usually bulky. In addition to the disadvantages associated with the space requirements for these relatively large passive filter components, high quality inductors can be quite costly. Furthermore, these LC filters are relatively insensitive to frequency changes, and this aspect of the LC filter networks is undesirable in the above type of prior art alarm systems. The present invention has been constructed to overcome all of the disadvantages associated with bulky and costly inductance-capacitance filter networks and yet provides very sensitive detection of low frequency signals.

OBJECTS AND FEATURES OF THE INVENTION

An object of the present invention is to provide a new and improved low cost frequency detection system which is very accurate at low frequencies.

Another object of this invention is to provide a compact frequency detection system which may be fabricated using one or more integrated circuits.

Another object of this invention is to provide a highly sensitive frequency detection system which is inexpensive to construct and which provides a maximum frequency indication using a minimum number of electronic circuit components.

Another object of this invention is to provide a frequency detection system of the type described which consumes very little power.

A feature of the present invention is the provision of voltage responsive means including a Schmitt trigger which responds to a frequency dependent DC ripple voltage to provide an output signal which is either at one or the other of two DC voltage levels or is alternating between these two voltage levels.

Another feature of this invention is the provision of novel one-shot multivibrator and associated filter circuitry constructed of UJTs and SCRs and responsive to a differentiated square wave voltage to provide an output signal having an average DC voltage inversely proportional to frequency of the input signal.

Another feature of this invention is the provision of DC level control circuitry which is coupled to the one-shot multivibrator circuitry and which provides an adjustable DC ripple voltage for driving a Schmitt trigger.

These and other objects and features of the present invention will become more fully apparent from the following description of the accompanying drawings.

DESCRIPTION OF THE DRAWINGS

FIG. 1 is a block diagram representation of the frequency detection system according to the present invention;

FIGS. 3—5 show waveform diagrams which illustrate the operation of the Schmitt trigger circuit shown in FIGS. 1 and 2.

THE INVENTION

Figure 2:
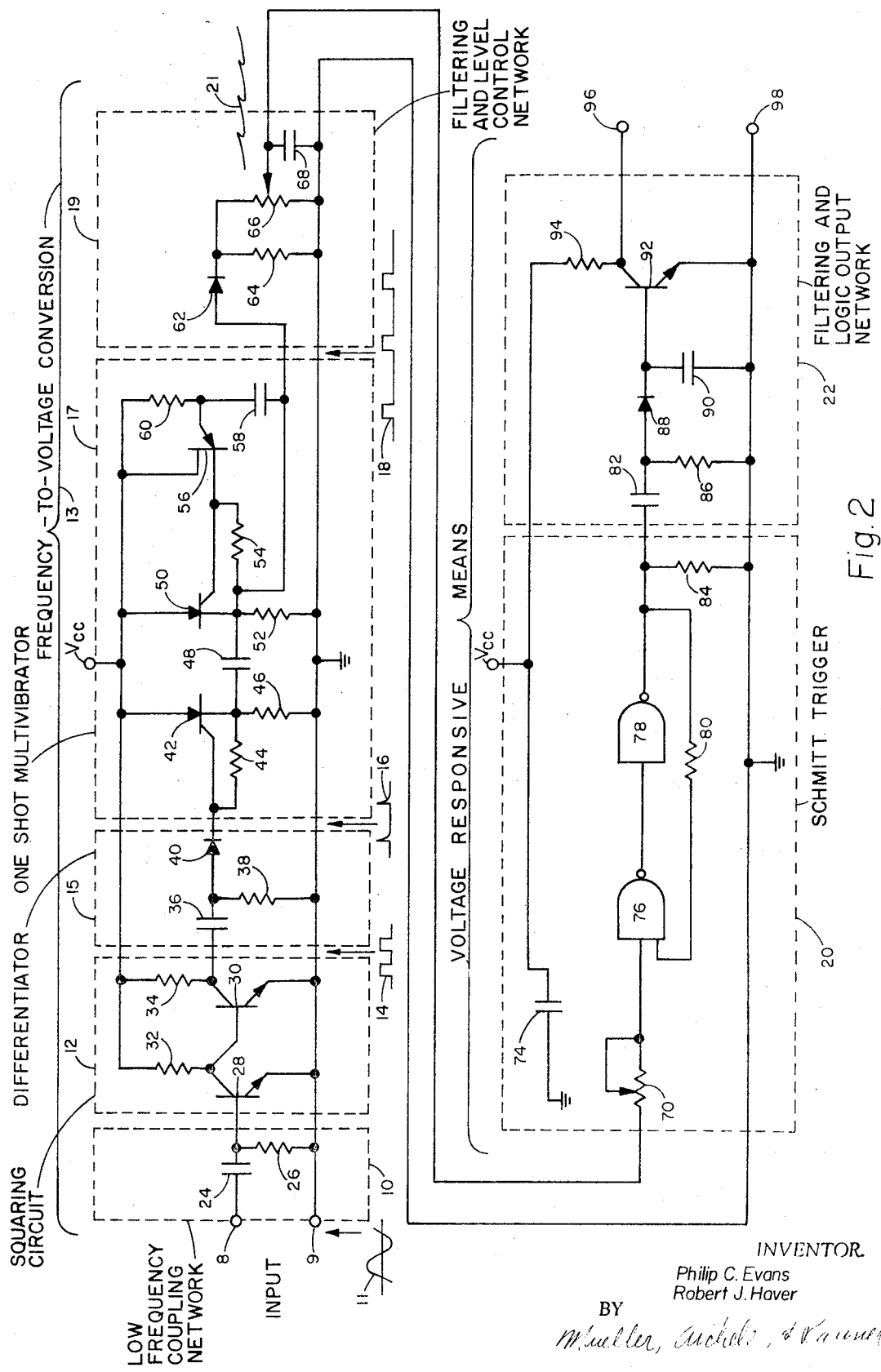
FIG. 2 is a schematic diagram of the frequency detection system of the invention.

Briefly described, the system of the present invention includes frequency-to-voltage conversion circuitry which is frequency responsive to an incoming fixed frequency signal and provides an output DC ripple voltage. Voltage responsive circuitry, including a Schmitt trigger, is connected to receive the DC ripple voltage and provides an indication that the incoming signal is either at a fixed frequency or is either higher or lower than a fixed frequency. An output circuit is connected to the Schmitt trigger and responds to the Schmitt trigger AC output voltage to provide an energizing current for a visual alarm system or the like.

Referring to the drawing in more detail and particularly to FIGS. 1 and 2, there is shown a low frequency RC coupling circuit 10 which blocks any DC voltage associated with the incoming AC signal. A typical low frequency signal that has been used is in the order of 20 Hz., and this low frequency signal 11 is coupled through input coupling circuit 10 to the wave shaping or squaring circuit 12 which converts the sine wave input to a square wave output voltage having a fixed duty cycle. This fixed duty cycle signal 14 is applied to a differentiator 15 which differentiates and clips the square wave voltage 14 and provides positive spikes 16 for driving a one-shot multivibrator 17. The output voltage of the multivibrator 17 is a series of pulses 18, the average voltage of which is inversely proportional to the frequency of the oscillator output signal 11. The one-shot multivibrator output signal 18 is applied to a filter and voltage level control means 19. The output voltage of the filter and voltage level control means 19 is a DC ripple voltage 21 which is coupled to the input of a Schmitt trigger 20.

The low-frequency coupling circuit 10, the wave shaping circuit 12, the differentiator 15, the one-shot multivibrator 17, and the filter and voltage level control means 19 constitute the frequency-to-voltage conversion means of the present invention. This frequency-to-voltage conversion means provide the output DC ripple voltage 21 having a level which is dependent upon the frequency of the incoming low frequency signal 11.

Depending upon the level of the DC ripple voltage 21, the Schmitt trigger 20 will produce an output voltage which is: (1) either at one or the other of two fixed voltage levels 110 and 106 as shown in FIG. 3, or (2) is a square wave output 114 which alternates between the two levels 110 and 106. Filter and logic output circuitry 22 is connected to the output of the Schmitt trigger circuit 20 and responds to the output voltage of the Schmitt trigger 20 to provide an indication that the frequency of the oscillator signal 11 is at a selected value or is either higher or lower than that selected value. The Schmitt trigger 20 and the filter and logic output circuitry 22 constitute the voltage responsive means of the present invention.

OPERATION

Referring in detail to FIG. 2, the system operation will be explained with reference to the processing of the signal through various stages of the system. A fixed, low-frequency signal 11 is applied between input terminals 8 and 9 and is coupled through the DC blocking capacitor 24 to the base of a first or input transistor 28 in the squaring or wave-shaping circuit 12. The sine wave voltage 11 will alternately turn transistor 28 on and off, and this switching will alternately turn transistor 30 off and on; i.e., transistors 28 and 30 alternately conduct in response to the incoming AC signal. The output collector voltage of transistor 30 is differentiated by a differentiating and clipping network 15 which includes capacitor 36, resistor 38, and diode 40. The differentiated square wave voltage is a series of positive and negative going spikes, the negative portions of which are blocked by diode 40 to obtain a series of positive spikes 16.

In the one-shot multivibrator circuitry 17, the semiconductor-controlled rectifier 50 is normally conducting and the SCR 42 is normally nonconducting in the absence of voltage spikes applied to the multivibrator. For this condition, capacitor 48 will be charged positive at the cathode of SCR 50. When a positive going voltage spike is coupled through diode 40 to the gate of SCR 42, SCR 42 turns on and the positive going pulse developed across resistor 46 is added to the voltage on capacitor 48 to raise the cathode voltage of SCR 50 above its anode voltage and turn SCR 50 off. Now capacitor 48 will charge through SCR 42 to become positive at the cathode of SCR 42. SCR 50 remains off until capacitor 58 in the unijunction transistor (UJT) 56 oscillator circuit fires the UJT 56 and thereby provides gate current at the gate of the SCR 50 to again turn on the SCR 50. Now the positive pulse across resistor 52 will again add to capacitor 48 voltage and will turn SCR 42 off. When capacitor 48 has recharged through SCR 50 to be positive at the cathode of SCR 50, then the multivibrator will have reverted at its original state.

The output voltage at the cathode of the SCR 50 is a square wave with an off time that is inversely proportional to the frequency of the fixed frequency input signal 11. This square wave voltage 18 is coupled through diode 61 in the filtering and level control network 19 to charge capacitor 68. The filter and voltage level control circuitry 19 slightly underfilters the square wave input voltage applied thereto to provide a DC ripple voltage across the capacitor 68. After each square wave pulse charges capacitor 68, there is a slight discharge of capacitor 68 into resistors 64 and 66; and the amount of DC voltage across capacitor 68 can be changed by varying the potentiometer tap on resistor 66. Diode 62 prevents the capacitor 68 from discharging back into the one-shot multivibrator stage 17.

The DC output ripple voltage 21 at the output of the filtering and voltage level control circuitry 19 is applied through a series potentiometer 70 and to the input of the Schmitt trigger 20. The capacitor 74 in the Schmitt trigger 20 is a decoupling capacitor for the power supply $V_{CC}$.

The function of the Schmitt trigger 20 will be better understood by referring to the voltage waveforms in FIGS. 3, 4 and 5. The Schmitt trigger 20 will turn on if the DC ripple voltage level at the input thereof reaches a certain $V_{ON}$ level 104, but will not turn off until the DC input voltage falls to an off voltage $V_{OFF}$ at level 102. Thus, there is a range defined as the hysteresis voltage $V_H$ between the $V_{ON}$ and $V_{OFF}$ voltages that controls the conduction of the Schmitt trigger 20. In FIG. 3a, the DC ripple voltage 100 never reaches the $V_{ON}$ level 104, and thus the Schmitt trigger 20 never turns on. Since the Schmitt trigger never turns on, the Schmitt trigger output voltage remains at a relatively low value as indicated at level 106 in FIG. 3b. This constant DC voltage level will indicate that the frequency of the incoming signal 11 is above some preselected frequency.

If the DC ripple voltage 108 (FIG. 4a) rises above $V_{ON}$ and then never falls below the $V_{OFF}$ level, this ripple voltage will turn on the Schmitt trigger 10 and keep it on. For this condition, the Schmitt trigger 20 will provide a relatively high voltage level 110 at the output thereof (FIG. 4b) which is indicative that the incoming signal frequency is below some preselected frequency. If the ripple voltage 112 is now adjusted so that its maximum point exceeds $V_{ON}$ and its minimum point falls below $V_{OFF}$ (FIG. 5a, the ripple voltage 112 will have the effect of turning the Schmitt trigger 20 on and off each time the ripple voltage exceeds $V_{ON}$ and decreases below $V_{OFF}$. Thus, for this condition of DC ripple voltage 112, the Schmitt trigger 20 output will be a square wave 114 (FIG. 5b) which oscillates between levels 106 and 110 and indicates that the input signal 11 is equal to some known preselected frequency.

Thus, by monitoring the output of the Schmitt trigger 20 for an AC or DC signal, it can be determined if the incoming signal 11 frequency is equal to a known frequency or is above or below a know frequency.

The present invention is not limited by any particular type of Schmitt trigger 20. The Schmitt trigger 20 used in the construction of the frequency detection system according to the present invention includes two cascaded integrated circuit NAND gates 76 and 78. The output of NAND gate 78 is connected through a feedback resistor 80 to one input of NAND gate 76. By increasing the resistance of potentiometer 70, hysteresis voltage $v_H$(FIG. 3) can be increased and the Schmitt trigger 20 will be more sensitive to frequency changes in the incoming signal 11.

The DC blocking capacitor 82 prevents any DC voltage from reaching the filter and logic output circuitry 22. However, an AC square wave 114 as shown in FIG. 5b will be coupled through the capacitor 82 to charge up capacitor 90 and turn on output transistor 92. Transistor 92 will be biased to conduction during the presence of the AC square wave 114, and the collector terminal 96 of the output transistor 92 will be at the $V_{CE(SAT)}$ saturation voltage of the transistor 92 during the conduction thereof.

The frequency detection system described above may be adjusted to detect a wide range of frequencies. By changing the values of resistor 60 and capacitor 58 in the one-shot multivibrator circuit 16, the detected frequency may be changed. Additionally, by adjusting potentiometers 66 and 70 or by changing the value of filter capacitor 68 in the filter and level control circuitry 18, the detected frequency may be changed.

The use of a DC ripple voltage to bias the Schmitt trigger 20 enables the Schmitt trigger 20 to provide three different output voltages for three different levels of DC ripple voltage input. This novel feature eliminates the need for extra Schmitt triggers for the detection of frequencies above and below the desired frequency.

Listed in the table below are values of components which have been used in a frequency detection system of the type described above which has been built and successfully operated.

TABLE

| Component | Value |
|---|---|
| Resistor (R) | |
| R26 | 1,000 ohms |
| R32 | 5,100 ohms |
| R34 | 2,700 ohms |
| R38 | 1,000 ohms |
| R44 | 1,000 ohms |
| R46 | 1,000 ohms |
| R52 | 1,000 ohms |
| R54 | 33 ohms |
| R60 | 100,000 ohms |
| R64 | 3,300 ohms |
| R66 | 5,000 ohms pot. |
| R70 | 10,000 ohms pot. |
| R80 | 82,000 ohms |
| R84 | 1,200 ohms |
| R86 | 1,000 ohms |
| R94 | 5,100 ohms |
| Capacitor (C) | |
| C24 | 25 microfarads |
| C36 | 0.1 microfarads |
| C48 | 0.1 microfarads |
| c58 | 0.1 microfarads |
| C68 | 100 microfarads |
| c74 | 0.25 microfarads |
| c82 | 10 microfarads |
| C90 | 100 microfarads |
| Supply Voltages | |
| $V_{cc}$ (frequency-to-voltage conversion circuitry) | 15 volts ± 1.0% |
| $V_{cc}$ (voltage-responsive circuitry) | 15 volts ± 1.0% |
| Input Voltage Level ($V_{in}$) | 2.5 volts peak to peak minimum 10 volts peak to peak maximum |
| Input Signal Frequency | 20 Hz. |
| Semiconductor Device Types | |
| NPN 28 | Motorola MPS 3394 |
| NPN 30 | Motorola MPS 3394 |
| Diode 40 | Motorola 1N 4002 |
| Diode 62 | Motorola 1N 4002 |
| Scr 42 | Motorola 2N 5060 |
| SCR 50 | Motorola 2N 5060 |
| UJT 56 | Motorola 2N 4870 |
| Diode 88 | Motorola 1N 4002 |
| 92 | Motorola MPS 3394 |
| Dual NAND Gates 76 and 78. | Motorola MC 662P |

However, the invention described above may be practiced other than as specifically described without departing from the scope thereof. For example, various other types of Schmitt triggers may be used in place of the Schmitt trigger 20 within the scope of this invention. In addition, various other types of frequency-to-voltage conversion circuits may be substituted for the frequency-to-voltage conversion means 13 within the scope of the present invention.

Similarly, the output circuitry 22 may be modified substantially within the scope of this invention. It is only necessary that the output circuitry provide a response to an AC signal to thereby give an indication that a know frequency is being received. It is also within the scope of the present invention to modify the frequency-to-voltage conversion circuitry so that the output voltage of the system is directly, rather than inversely, proportional to input frequency. Thus, the term "proportional" as used in the claims is intended to mean inversely as well as directly proportional. Accordingly, the present invention is limited only by way of the following appended claims.

We claim:

1. A frequency detection system including in combination:
   a. frequency-to-voltage conversion means comprising
      differentiating means for providing spiked output pulses in response to a rectangular wave input signal,
      a one-shot multivibrator coupled to receive spiked pulses of a selected polarity from said differentiating means to thereby provide an output signal having an average DC voltage proportional to the frequency of the input signal, and
      means for under filtering said average DC voltage at the output at said one-shot multivibrator for providing a DC ripple voltage for driving voltage responsive means, and
   b. voltage responsive means coupled to said filtering means and being responsive to said DC ripple voltage to provide an output signal which is either at one or the other of two DC voltage levels or is alternating between said two voltage levels.

2. The frequency detection system defined in claim 1 wherein said voltage responsive means includes a Schmitt trigger having a preselected hysteresis voltage range and responsive to said DC ripple voltage having values above and below said hysteresis voltage range to provide an alternating output signal, said Schmitt trigger also providing a first DC output voltage when said ripple voltage is below a maximum value of hysteresis voltage of said Schmitt trigger and providing a second DC output voltage when said ripple voltage is above a minimum value of hysteresis voltage of said Schmitt trigger.

3. The frequency detection system defined in claim 1 wherein said voltage responsive means includes output circuit means responsive to said alternating output signal to remain fully conductive as long as said alternating output signal is present, said output circuit means being nonresponsive to a DC voltage applied thereto.

4. A frequency detection system including in combination:
   a. means for receiving a fixed frequency input signal,
   b. frequency-to-voltage conversion means coupled to said receiving means for providing an output DC ripple voltage, the level of which is proportional to the frequency of the input signal comprising,
      wave shaping means connected to receive said fixed frequency input signal to provide an output voltage having a fixed duty cycle,
      differentiating means connected to said wave shaping means for providing spiked output pulses,
      a one-shot multivibrator connected to receive said spiked output pulses of a selected polarity for providing output pulses having an average voltage which is proportional to the frequency of said fixed frequency input signal, and
      filter means connected to said one-shot multivibrator for providing an under filtered DC ripple voltage for driving said voltage responsive means, and
   c. voltage responsive means connected to receive said DC ripple voltage and responsive to said DC ripple voltage to provide a voltage at either one or the other of two fixed levels or an alternating output voltage,
      said voltage responsive means including output circuit means responsive to said alternating output voltage to remain fully conductive as long as said alternating output signal is present, and said output circuit means being nonresponsive to a DC voltage applied thereto.

5. The frequency detection system defined in claim 4 wherein said voltage responsive means include a Schmitt trigger having a hysteresis voltage $V_H$ which is the voltage range between the level required to turn on said trigger and the level required to turn on said Schmitt trigger and the level at the Schmitt trigger turns off, said Schmitt trigger being responsive to different envelopes of DC ripple voltage applied thereto to provide three different outputs indicative of the frequency of the fixed frequency signal.

6. The frequency detection system defined in claim 5 wherein said wave shaping means include a squaring circuit connected to receive a sine wave input signal and responsive to said sine wave signal to provide a rectangular wave output voltage for driving said frequency-to-voltage conversion means.

7. The frequency detection system defined in claim 6 which further includes output circuit means connected to the output of said Schmitt trigger, said output circuit means having a blocking capacitor therein which renders said output circuit means nonresponsive to a DC voltage at the output of said Schmitt trigger and operative to couple to an AC voltage to an output transistor to turn on said output transistor and maintain said output transistor conducting during the presence of an AC voltage at the output of said Schmitt trigger.